UNITED STATES PATENT OFFICE.

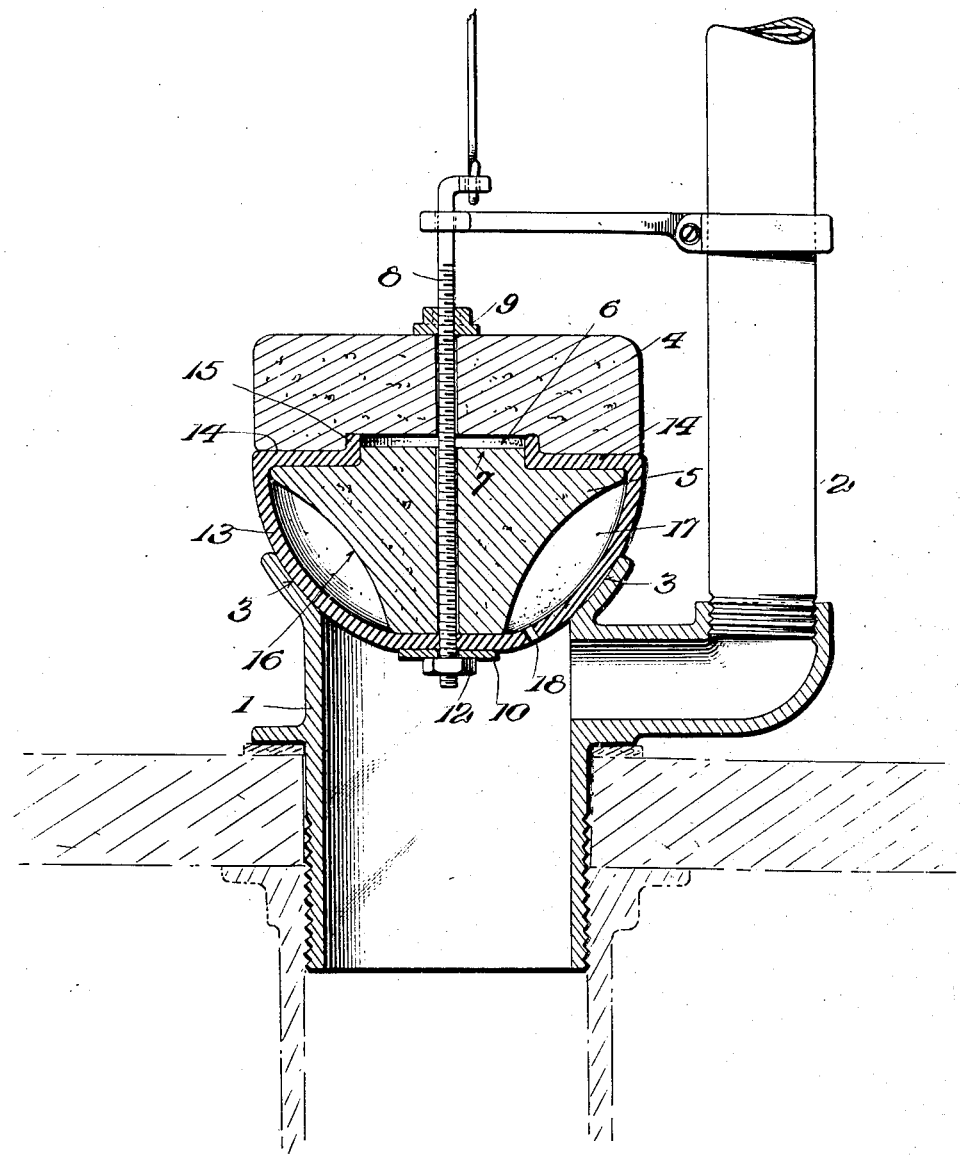

EDWARD L. DELANY, OF BROOKLYN, NEW YORK.

FLUSH-TANK VALVE.

1,334,136. Specification of Letters Patent. Patented Mar. 16, 1920.

Application filed May 16, 1919. Serial No. 297,529.

*To all whom it may concern:*

Be it known that I, EDWARD L. DELANY, of Brooklyn, in the county of Kings and State of New York, have invented certain new and useful Improvements in Flush-Tank Valves; and I do hereby declare the following to be a full, clear, and exact description of the invention, such as will enable others skilled in the art to which it appertains to make and use the same.

My present invention has particular reference to those valves equipped with washers of substantially spherical formation. It is common in the art to use a ball of rubber. As heretofore made these washers soon swell and become distorted owing to the chemical action of the water and because the washers have not been securely held to the valve bodies.

In the drawing the figure is a vertical sectional view showing a valve mechanism embodying my present improvements.

I have shown a valve casing 1 formed with an overflow tube 2 and a valve seat 3 which is concaved and flared to receive the valve. The valve body comprises two parts, 4, 5, preferably made of a cork composition, or they may be made of hollow glass or metal or a combination of these. The valve parts are shown superposed, and the upper part 4 is formed with a rabbeted portion 6 at its meeting face and the part 5 is formed with a raised surface 7 to enter the rabbeted portion 6. A stem 8 is shown extended vertically through the valve body and carrying a nut 9, a ring 10 and nut 12.

The washer 13 is of peculiar formation. It is shown with a flat bottom for engagement with the ring 10, the remainder of its surface being of substantially semi-spherical formation having an inward extending shoulder 14 terminating in a raised lip or flange 15 seated in the rabbeted portion 6. The flat bottom of the washer is perforated to receive the stem 8 and the ring 10 bears against its outer surface, holding it between the ring and the flat base of the lower part 5 of the valve body, this base being of width about corresponding to the flat bottom.

The part 5 of the valve body is tapered downward and annularly concaved as at 16 in opposition to the washer and the valve seat 3. This provides a space 17 between the valve body and the washer. The washer is formed with a vent 18 at a point below the point of contact with the seat 3, that is at a point normally not submerged.

In practice the parts are normally in the position illustrated, with the washer well spaced apart from the concaved surface of the part 5 of the valve body. Under the pressure of the water the washer will conform to the seat 3. It is well known that the seats and washers seldom correspond exactly, however much effort is made to render them precisely alike. My washer is free to bend until it is in complete contact with the seat. In thus bending or yielding the washer partially exhausts the the air within it through the vent 18. The space 17 is always in communication with the valve casing 1, thus balancing the pressure. When the stem 8 is raised to open the valve the water cannot enter the washer because of the air within it and the valve will float by reason of its light weight and large displacement.

The manner in which my washer is held to the valve parts promotes its utility and durability. This is accomplished by the formation of the adjacent surfaces of parts 4 and 5, the nut 9, and ring 10 and its nut 12.

I claim as my invention:

1. A valve mechanism comprising a valve seat, a valve body having a flat bottom, a semi-spherical washer carried by said valve body and adapted to rest on said seat, said washer having a flat surface corresponding to and contacting with the flat bottom of the valve body, a space being provided between said washer and the sides of said valve body, a stem extending through said washer and valve body, a nut threaded on said stem above said valve body, a ring on said stem below the flat bottom of said washer, and a nut on the lower end of said stem bearing against said ring to bind said washer against the valve body.

2. A valve mechanism comprising a valve seat, a two part valve body, a semi-spherical washer having a shoulder held between the two parts of said valve body, the lower of said parts being reduced in thickness toward its lower end to provide a space between itself and said washer, a vent being formed in said washer below its point of contact with said seat, and means for binding said valve body parts together.

3. A valve mechanism comprising a substantially semi-spherical washer having a vent therein, and a valve body having two superposed parts between which said washer is held, the lower of said valve body parts having a concaved surface to provide a space between itself and said washer, and a seat for said washer.

4. A valve mechanism comprising a flaring and concaved valve seat, a valve body comprising two superposed parts, a stem extending through and secured to said parts, one of said parts having a rabbeted portion at its meeting face and the other having a raised surface to enter said rabbeted portion, said lower part having its periphery concaved oppositely to said seat, and a flexible washer carried by the parts of said valve body and being of substantially semi-spherical formation to engage said seat and provide a space between itself and said lower valve body part, and having an inward extending shoulder held between said valve body parts and terminating in a flange adapted to enter said rabbeted portion.

In testimony whereof I have signed this specification.

EDW. L. DELANY.